US 6,512,846 B1

(12) United States Patent
Luo

(10) Patent No.: US 6,512,846 B1
(45) Date of Patent: Jan. 28, 2003

(54) DETERMINING ORIENTATION OF IMAGES CONTAINING BLUE SKY

(75) Inventor: Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/450,366

(22) Filed: Nov. 29, 1999

(51) Int. Cl.$^7$ ................................................. G06K 9/00
(52) U.S. Cl. ...................... 382/165; 382/164; 382/295; 382/225
(58) Field of Search ................................ 382/162–167, 382/224–228, 293–97; 358/598–527

(56) References Cited

U.S. PATENT DOCUMENTS

| 5,642,443 A | 6/1997 | Goodwin et al. ........... 382/289 |
| 5,889,578 A | 3/1999 | Jamzadeh ..................... 355/41 |
| 5,901,245 A | 5/1999 | Warnick et al. ............. 382/190 |
| 6,275,615 B1 | 8/2001 | Ida et al. ..................... 382/173 |
| 6,301,440 B1 | 10/2001 | Bolle et al. ............... 348/229.1 |

OTHER PUBLICATIONS

Vailaya et al. "Automatic image orientation detection" Proc. 1999 International Conf. on Image Processing, 1999, vol. 2, pp.600 604, Oct. 1999.
"Neural Network Toolbook for Use with MATLAB" by Howard Demuth and Mark Beale. The MathWorks, Inc., 1998.
"The Nature of Light & Colour in the Open Air" by M. Minnaert. Dover Publications, Inc., 1954.
"Towards Physics–based Segmentation of Photographic Color Images" by Jiebo Luo, Robert T. Gray, Hsien–Che Lee. Proc. IEEE Int. Conf. Image Process., 997.
"On Image Classification: City vs. Landscape" by Aditya Vailaya, Anil Jain, and Hong Jiang Zhang, 1998.
"Decoding Image Semantics Using Composite Region Templates" by John R. Smith and Chung–Sheng Li. Proc. IEEE Intl. workshop on Content–based Access of Image and Video Database, 1998.
"Indoor–Outdoor Image Classification" by Martin Szummer and Rosalind W. Picard. Proc. IEEE Intl. Workshop on Content–based Access of Image and Video Database, 1998.
"Automatic Image Annotation Using Adaptive Color Classification" by Eli Saber, A. Murat Tekalp, Reiner Eschbach and Keith Knox. Graphical Models and Image Processing, vol. 58, No. 2, Mar. pp. 115–126, 1996.

*Primary Examiner*—Jingge Wu
(74) *Attorney, Agent, or Firm*—David M. Woods

(57) ABSTRACT

A method, image recognition system, computer program, etc., for determining image orientation. The invention classifies potential sky pixels in the image by color, identifies spatially contiguous regions of the potential sky pixels, identifies actual sky regions by eliminating ones of the spatially contiguous regions that have a texture above a predetermined texture threshold, computes desaturation gradients of the actual sky regions, classifies the image as one of portrait and landscape based on average absolute values of horizontal and vertical desaturation gradient of pixels within each of the actual sky regions, determines orientation of the image based on a polarity of the average horizontal and vertical desaturation gradients, and confirms that the actual sky regions are true sky regions by comparing the desaturation gradients with a predetermined desaturation gradient for sky.

38 Claims, 13 Drawing Sheets

DETERMINING ORIENTATION OF IMAGES CONTAINING BLUE SKY

CROSS-REFERENCE TO RELATED APPLICATION(S)

Reference is made to commonly assigned copending application Ser. No. 09/450,190, entitled "Method for Detecting Sky in Images" and filed in the names of Jiebo Luo and Stephen Etz, which is assigned to the assignee of this application.

BACKGROUND OF THE INVENTION

1. Field of the Invention

The invention relates generally to the field of digital image processing and digital image understanding, and more particular to a system for determining the orientation in photographic and other similar images containing sky.

2. Description of the Related Art

Digital images may be acquired through a number of means, including scanning a picture captured on negative films or direct downloading from a digital camera. A photographer can take a picture while holding the camera in any of the possible ways (upright, upside down, rightside up, or leftside up). In addition to that, the film may be loaded from left to right or from right to left, resulting in unpredictable image orientation. It is beneficial to have an automatic way of sensing image orientation to avoid tedious reorientation of an image, which would otherwise need to be performed by an operator. It is also an efficiency issue for mass image processing in commercial systems.

Sky is among the most important subject matters frequently seen in photographic images. Detection of sky can often facilitate a variety of image orientation, understanding, enhancement, and manipulation tasks. Sky is a strong indicator of an outdoor image for scene categorization (e.g., outdoor scenes vs. indoor scenes, picnic scenes vs. meeting scenes, city vs. landscape, etc.). See, for example M. Szummer and R. W. Picard, "Indoor-Outdoor Image Classification," in *Proc. IEEE Intl. Workshop on Content-based Access of Image and Video Database*, 1998 and A. Vailaya, A. Jain, and H. J. Zhang, "On Image Classification: City Vs. Landscape," in *Proc. IEEE Intl. Workshop on Content-based Access of Image and Video Database*, 1998 (both of which are incorporated herein by reference).

The most prominent characteristic of sky is its color, which is usually light blue when the sky is clear. Such a characteristic has been used to detect sky in images. For example, U.S. Pat. No. 5,889,578, entitled "Method And Apparatus For Using Film Scanning Information To Determine The Type And Category Of An Image" by F. S. Jamzadeh, (which is incorporated herein by reference) mentions the use of color cue ("light blue'") to detect sky without providing further description.

In a work by Saber et al. (E. Saber, A. M. Tekalp, R. Eschbach, and K. Knox, "Automatic Image Annotation Using Adaptive Color Classification," CVGIP: *Graphical Models and Image Processing*, vol. 58, pp. 115–126, 1996, incorporated herein by reference), color classification was used to detect sky. The sky pixels are assumed to follow a 2D Gaussian probability density function (PDF). Therefore, a metric similar to the Mahalonobis distance is used, along with an adaptively determined threshold for a given image, to determine sky pixels. Finally, information regarding the presence of sky, grass, and skin, which are extracted from the image based solely on the above-mentioned color classification, are used to determine the categorization and annotation of an image (e.g., "outdoor'", "people"). Note that Saber does not deal with determination of image orientation, which is assumed known.

U.S. Pat. No. 5,642,443, entitled, "Whole Order Orientation Method And Apparatus" by Robert M. Goodwin, (which is incorporated herein by reference) uses color and (lack of) texture to indicate pixels associated with sky in the image. In particular, partitioning by chromaticity domain into sectors is utilized by Goodwin. Pixels with sampling zones along the two long sides of a non-oriented image are examined. If an asymmetric distribution of sky colors is found, the orientation of the image is estimated. The orientation of a whole order of photos is determined based on estimates for individual images in the order. For the whole order orientation method in Goodwin to be successful, a sufficiently large group of characteristics (so that one with at least an 80% success rate is found in nearly every image), or a smaller group of characteristics (with greater than a 90% success rate—which characteristics can be found in about 40% of all images) is needed. Therefore, with Goodwin, a very robust sky detection method for any given image is not required.

For recognizing the orientation of an image, knowledge of sky and its orientation may indicate the image orientation for outdoor images. Contrary to the common belief, a sky region is not always at the top of an image. In many cases, a sky region may touch more than the top border of an image.

Problems to be Solved by the Invention

A major drawback of conventional techniques is that they utilized the location of objects (e.g., sky) to determine orientation. Those conventional systems which identify sky in images suffer from the disadvantage that the sky may not always appear at the top of the image and may also touch more than the top border of an image. Further, conventional techniques cannot differentiate sky from other similarly colored or textured subject matters, such as a blue wall, a body of water, a blue shirt, and so on. Failure to reliably detect the presence of sky, in particular false positive detection, and an inadequate assumption that the location of the sky indicates the image orientation, may lead to failures in orientation process.

SUMMARY OF THE INVENTION

The invention provides a robust image orientation process that identifies sky based on color hue classification, texture analysis, and physics-motivated sky trace analysis. The invention utilizes hue color information to select bright, sky colored pixels and utilizes connected component analysis to find potential sky regions. The invention also utilizes gradient to confirm that sky regions are low in texture content and segments open space, defined as smooth expanses, to break up adjacent regions with similar sky color beliefs but dissimilar sky colors. The invention further utilizes gradient to determine the zenith-horizon direction and uses a physics-motivated sky trace signature to confirm the determined orientation indeed comes from a valid sky region (as opposed to a merely "sky-colored" region).

More specifically, the invention can take the form of a method, image recognition system, computer program, etc., for determining image orientation. The invention classifies potential sky pixels in the image by color, identifies spatially contiguous regions of the potential sky pixels, identifies actual sky regions by eliminating ones of the spatially contiguous regions that have a texture above a predetermined texture threshold, computes desaturation gradients of the actual sky regions, classifies the image as one of portrait and landscape based on average horizontal and vertical desaturation gradient values of pixels within each of the actual sky regions, determines orientation of the image based on a polarity of the average horizontal and vertical desaturation gradients, and confirms that the actual sky regions are true sky regions by comparing the desaturation gradients with a predetermined desaturation gradient for sky.

The invention also maintains only ones of the spatially contiguous regions as the actual sky regions which have substantially dissimilar average horizontal and vertical gradients, have a color distribution which is consistent with a predetermined color distribution for sky, and contact a border of the image.

The classifying of the image as one of portrait and landscape includes classifying the image as the portrait if an absolute value of the average horizontal desaturation gradient is greater than an absolute value of the average vertical desaturation gradient and classifying the image as the landscape if an absolute value of the average horizontal desaturation gradient is less than an absolute value of the average vertical desaturation gradient. The desaturation gradients comprise desaturation gradients for red, green and blue trace components of the image.

The predetermined desaturation gradient for sky comprises, from horizon to zenith, a decrease in red and green light trace components and a substantially constant blue light trace component.

The classifying potential sky pixels in the image by color comprises forming a belief map of sky color pixels, computing an adaptive threshold of sky color, and determining if the potential sky pixels exceed the threshold. The computing of the adaptive threshold comprises identifying a first valley in a belief histogram derived from the belief map. The belief map and the belief histogram are unique to the image.

ADVANTAGES OF THE INVENTION

One advantage of the invention lies in the utilization of a physical model of the sky based on the scattering of light by small particles in the air to determine image orientation. By using a physical model (as opposed to a color or texture model), the invention is not likely to be fooled by other similarly colored subject matters such as bodies of water, walls, toys, and clothing. Further, the inventive region extraction process automatically determines an appropriate threshold for the sky color belief map. By utilizing the physical model in combination with color and texture filters, the invention produces results that are superior to conventional systems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

As discussed above, it is beneficial to have an automatic way of sensing image orientation to avoid tedious reorientation of an image, which would otherwise need to be performed by an operator. It is also an efficiency issue for mass image processing in commercial systems. Further, a robust sky detection process needs to go beyond color and texture. Specifically, a physical model of the sky is desirable, if possible, to differentiate true sky regions from other similarly colored and textured subject matters. The invention described below provides a robust sky detection process that differentiates true sky regions from other similarly colored and textured subject matters.

In this application, sky detection comprises identifying all the pixels in an image that correspond to the unoccluded part of the sky. Furthermore, sky detection assigns each individual segmented region a probability that it contains sky. It is left to the subsequent conventional processing of the image understanding system to either utilize the probability representation or convert it into a crisp decision. Some important features of the invention include a robust sky detection process based on color hue classification, texture analysis, and physics-motivated sky trace analysis; utilization of color hue information to select bright, sky colored pixels; utilization of connected component analysis to find potential sky regions; utilization of gradient to confirm that sky regions are low in texture content (i.e., open space); utilization of open space segmentation to break up adjacent regions with similar sky color beliefs and dissimilar sky colors; utilization of gradient to determine the zenith-horizon direction; and utilization of a physics-motivated sky trace signature to determine if a candidate region fits a sky model.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Figure 1:
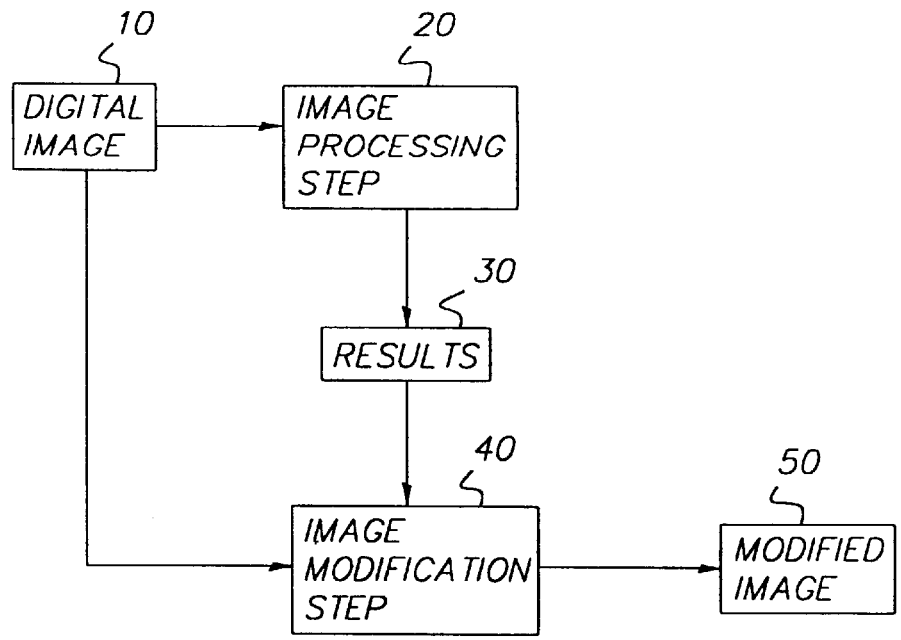
FIG. 1 is a schematic architectural diagram of one embodiment of the invention.

A block diagram of the overall sky detection system (e.g., the digital image understanding technology) is shown in FIG. 1. First, a digital image 10 is digitally processed 20.

The results 30 obtained from processing step 20 are used along with the original digital image 10 in an image modification step 40 to produce a modified image 50.

Figure 2:
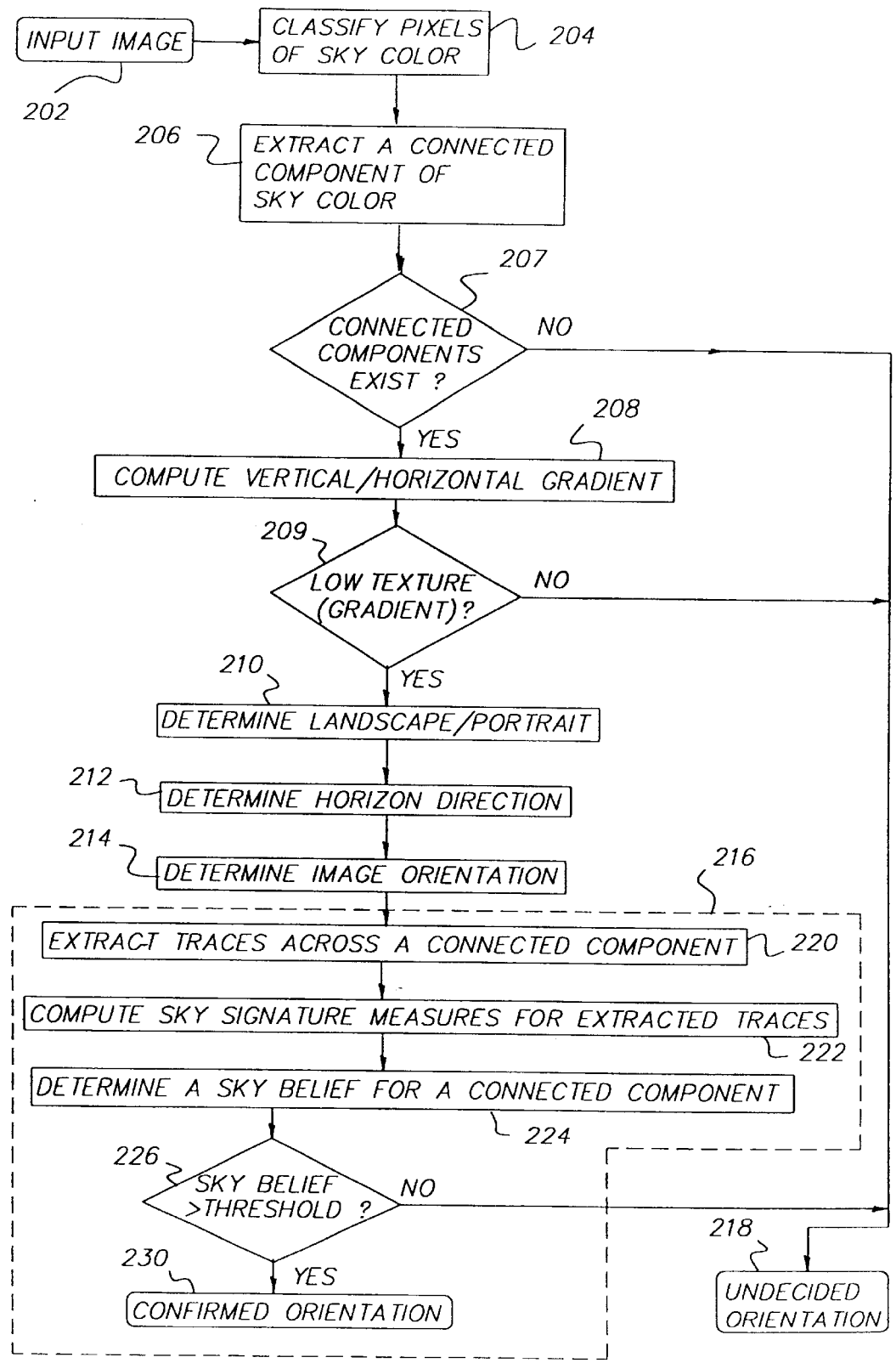
FIG. 2 is a schematic architectural diagram of one embodiment of the invention.

Referring now to FIG. 2, there is shown a more specific block diagram of the present invention. In FIG. 2, an input image is received in digital form 202. The pixels are then classified into sky-colored and non-sky-colored pixels 204, as discussed in greater detail below, using a color classifier, in a classification process. Using the connected component analysis discussed below, a spatially contiguous region of sky-colored pixels is extracted 206. If connected components of considerable sizes do not exist, the orientation of the image can not be determined by the present invention 207. To the contrary, if at least one of the connected components in the image has a size above a given threshold, processing continues as discussed below.

The connected component size threshold discussed above, can be determined manually or automatically. The minimum connected components size threshold can be set as a certain percentage of the total image areas. For example, the connected component size threshold could be set as 1%, 15%, 25% 50%, 75% of the total image area and, in one preferred embodiment is set at 10% of the total image area. Alternatively, the threshold could be determined automatically based upon historical. For example, a historical data base may be maintained with respect orientation which indicates the optimum minimum connected component size for a specific type of image. Also, some or all of a batch of images may be pre-processed (e.g., small test runs can be performed) using different connected component size limitations to determine the optimum threshold size prior to actual image orientation of all images in the batch.

Gradient operators are overlaid on every interior pixel of the connected component ("region") to compute horizontal and vertical gradient values 208, as discussed below. Note that the horizontal and vertical directions here are in reference to the incoming orientation of the image. This incoming orientation, as explained previously, has no bearing on the actual orientation of the scene within the image. The pixels near-the boundary of the connected component (e.g., the outermost two pixels all around the connected component) are excluded from the gradient calculation because they represent the often-great transition between sky and other subject matters, for example, the horizon.

Average horizontal and vertical gradient values, Gx and Gy, are computed (as discussed below) using all the interior pixels of the candidate region. A number of tests are utilized by the invention to disqualify various candidate regions 209. More specifically, if either value is above a pre-determined high threshold $T_{high}$, meaning that the region is highly textured, the region is not considered a sky region. If |Gx| and |Gy| are almost identical, indicating a flat region, the region is also not considered a sky region. Furthermore, if the color (hue) distribution of all the pixels in the candidate region does not fit the expected characteristic of a sky region, the region is also not considered a sky region. With respect to the color distribution, the 3D shape of the sky color distribution should resemble a tilted ellipsoid, which is a result of the desaturation effect, discussed below. Also, if the candidate region is not in contact with any image border, the region is not likely to be sky. If the image does not contain any acceptable candidate sky regions, the invention cannot determine orientation and processing will produce an undecided orientation 218.

If at least one candidate region passes the low texture test, the landscape/portrait orientation 210 and the direction of the horizon 212 are determined for each of the candidate sky regions. In particular, preferably, the gradient in the red channel is examined because the desaturation effect is most observable and measurable in the red channel. Note that the horizontal and vertical gradients denoted by Gx and Gy are in reference to the incoming orientation of the image, which is assumed to be landscape but unrelated to the scene orientation. In particular, if |Gy|>|Gx|, there is an indication of a true landscape image; otherwise the image is a portrait image. Furthermore, for a landscape image, if Gy<0, there is an indication of an upside-up image; otherwise the image is an upside-down image. For a portrait image, if Gy<0, there is an indication of an upside-left image; otherwise the image is an upside-right image.

Using this information, the invention is able to accurately determine the correct image orientation 214. In the present invention, image gradient is computed using the following Sobel kernels:

$$S_x = \begin{bmatrix} 1 & 2 & 1 \\ 0 & 0 & 0 \\ -1 & -2 & -1 \end{bmatrix} \qquad S_y = \begin{bmatrix} 1 & 0 & -1 \\ 2 & 0 & -2 \\ 1 & 0 & -1 \end{bmatrix}$$

Further, using convolution operations denoted by $\Theta$, two gradient images are obtained: $g_x = S_x \Theta I$ and $g_y = S_y \Theta I$. The average gradient of a candidate region is obtained by $$G_x = \frac{1}{N_p}\sum_p g_x(p) \qquad \text{and} \qquad G_y = \frac{1}{N_p}\sum_p g_y(p),$$

where p is an interior pixel of the candidate region and $N_p$ is the total number of interior pixels. The average gradient values in horizontal and vertical directions, Gx and Gy, are used to determined image orientation as described previously.

The conventional orientation processes are simply based on the assumption that "sky is at the top of the image" (Goodwin, supra). To the contrary, the present invention uses the internal characteristic of the sky, that is, the sky is blue at the top and becomes desaturated towards the horizon to determine scene orientation.

Image orientation can be further confirmed by confirming the location of sky in the image by the subprocess shown as item 216. More specifically, traces are extracted across a candidate sky region along the horizon-zenith direction 220, determined as described above. For each trace, a plurality of sky-trace signatures (discussed below) are measured 222 to determine whether each trace likely comes from a sky region. The likelihood, or belief that a candidate region is sky, is determined by the voting from all the extracted traces 224. If the overall belief of a candidate region is above a predetermined threshold 226, the candidate region is declared a sky region 230 and orientation is confirmed.

This confirmation process 216 is desirable for a more robust determination of the image orientation. With this confirmation process 216, there is a greater degree of confidence in the determined sky orientation and accordingly, the image orientation, because there is a greater degree of confidence in the source of the orientation information. The conventional way of using the location of a sky-colored region to determine the image orientation is unreliable. The innovative way of using the desaturation effect in a sky-colored, low-texture region is much more reliable. Indeed, the most reliable way of identifying orientation is using the desaturation effect (e.g. horizon to zenith trace desaturation gradients, described below) in a confirmed sky region.

All candidate regions are analyzed in the same fashion. In the case where detected sky regions disagree on the sky orientation, the overall orientation of the image is decided by the results from larger, higher belief sky regions. Regions with the conflicting sky orientation are ignored.

It is almost axiomatic that, to the human visual system, the sky is blue, grass is green, dirt is gray/red/brown, and water is blue/green. However, what is actually recorded in a digital image is somewhat different. This is true not only for sky regions that contain warm colors associated with sunrise and sunset, but also for sky regions that appear more blue than their color records indicate. To confound even more the problem, color balance of the whole image can be off due to the error introduced during image capture and in other stages of the imaging chain.

The blue appearance of the sky in a color image is the result of human physiology and psychology, as well as physics—the red and green component at a blue-appearing sky pixel can be more intense (by a small percentage) than the blue component. In addition, clear, unclouded sky is usually the brightest subject matter in an image, although the sun itself, illuminated clouds, snow, ice or some man-made objects can be brighter than the blue sky. The sun radiates most brightly in the orange-yellow wavelength. The wavelength selective scattering of air particles disperses the blue light component of the sun ray's much more strongly than the longer wavelength according to Rayleigh's law, which states that scattering is inversely proportional to the fourth power of the wavelength (e.g., see C. F. Bohren and D. R. Huffman, *Absorption and Scattering of Light by Small Particles*, New York, John Wiley and Sons, 1983, incorporated herein by reference). The color of the sky is, indeed, largely composed of violet (to which our eyes are not very sensitive) and further a fair amount of blue, a little green and very little yellow and red—the sum of all these components is sky-blue (e.g., see M. Minnaert, *The Nature of Light and Color in the Open Air*. New York: 1954, incorporated herein by reference).

However, the blue appearance of the sky is not uniform. Sky often appears desaturated toward the horizon. When one looks at the clear sky directly overhead with the sun off to the side, the scattered blue light dominates and the sky appears as deep blue. As one shifts the gaze towards the direction of the sun, the relative strength of the longer wavelength components increases so that the sky appears less blue. As one moves the gaze towards a distant horizon, the various selective factors tend to equalize and the sky appears desaturated to almost white.

There are a number of interesting effects regarding the distribution of light in the sky, e.g., halos, mirages, and rainbows. Among them, the light intensity increases from the zenith to the horizon while at the same time the color changes from deep blue to white. This effect arises primarily from the great thickness of the layer of air between our eyes and the horizon. Although the small particles of the air scatter the blue rays by preference, the scattered rays are weakened most in their long path from the scattering particles to our eyes. Because of a very thick stratum of air, the scattering and attenuation effects counteract each other.

Suppose a small particle at a distance s from a given spot scatters the fraction sds (where s is the color-dependent scattering factor and ds is the size of the particle). The amount of light is weakened in the ratio $e^{-sx}$ before reaching that given spot. The light received from an infinitely thick layer of air (a reasonable approximation) would consist of the sum of contributions from all the particles ds, that is, $$\int_0^\infty se^{-sx}dx,$$

which is equal to one. Evidently, the amount of received light is then independent of s, and thus the color of the light.

Therefore, the sky close to the horizon shows the same brightness and color as a white screen illuminated by the sun. Moreover, the layers of air close to the ground may contain more floating large particles of dust, which scatter light of all colors equally intensely and make the color of the light whiter (even when the layer of air cannot be considered to be of infinite thickness).

If the observer is facing away from the sun, when the sun shines behind the observer or laterally, the concentric distribution of the light can be approximately parallel to the horizon because of the position of the sun (high above the horizon) as well as the observer's limited view. If the observer looks in the direction of the sun (one should stand in the shadow of a building near the edge of the shadow), the brightness of the sky increases rapidly close to the sun and even becomes dazzling, its color becoming more and more white. In photographic images, it is extremely unlikely that one would take a picture of the direct sun light, except at sunrise or sunset, when the sun is on the horizon and the intensity of the light is much weaker.

Figure 3A:
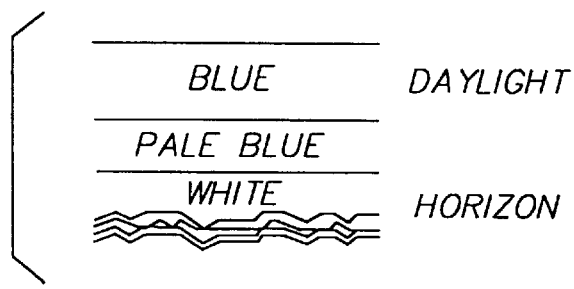
FIGS. 3A–3B are schematic diagrams illustrating the colors of daylight and twilight, respectively, in a clear sky.
Figure 3B:
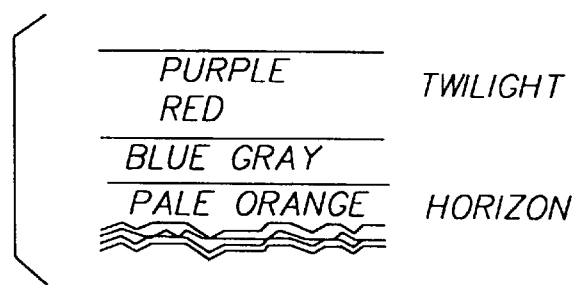

While the blue sky can be considered as the finest example of a uniform gradation of color, twilight's exhibit much more dramatic color gradation in a similar form of concentric distribution of constant brightness and color, as illustrated in FIGS. 3A–B. More specifically, FIGS. 3A–B illustrates the different colors, which are seen at the eastern horizon as the sun sets (e.g., daylight vs. twilight) in the western horizon. Although it is not the focus of this invention to detect twilight sky, these unique signatures of the twilight sky can be exploited in a more general sky detection process. In fact, when one of the features used in the invention was turned off, the process successfully detected the twilight sky in FIG. 3B, as discussed below.

It is also important to look at the factors determining the color of the water, which is often indistinguishable from that of the sky. Part of the light our eye receives from water is reflected by the surface; it acts like a mirror when it is smooth, and the color of the water is blue, gray according to the color of the sky. The color of the sea (or any large open body of water) in the distance is about the same as that of the sky at the height of 20° to 30°, and darker than the sky immediately above the horizon. This is because only part of the light is reflected when our gaze falls on the slopes of distant wavelets (e.g., see Minnaert, supra).

Apart from reflection, deep water has a "color of its own"—the color of the light scattered back from below. The depth of the deep water and similar deep water can be considered so great that practically no light returns from the bottom of it. The "color of its own" is to be attributed to the combined effects of scattering and absorption in the water. The color of deep, almost pure water is blue due to the absorption by the water in the orange and red parts of the spectrum, after the light penetrates the water and is scattered back again.

For the purpose of sky detection, one important issue is to differentiate bodies of blue (usually deep) water, whether they co-appear with the sky or not, from the sky. The factors of great concern are the absorption of orange and red components of the light by the water. The waves and undulations of such deep water bodies create small surfaces of various slopes. In general, the color is darker when our gaze falls on a surface more perpendicular to the gaze or closer to us. However, the changes are primarily in brightness instead of hue.

Turning now to color classification, mentioned briefly above (e.g., item 201 in FIG. 2), the invention first trains a color classifier specifically for clear, light-blue sky seen at daytime for simplicity and clarity. Sky regions which contain the warm colors associated with sunrise and sunset are not be lumped in with the blue-sky and gray-sky regions that form the background in many outdoor scenes. In the context of the invention, the color-based detection identifies all candidate blue sky pixels, which are then screened as regions for spatial signatures consistent with clear sky.

Neural network training is then utilized to complete the training of the color classifier. The initial training set includes images having ideal blue sky characteristics, gray sky images, and non-sky (primarily indoor) images. All blue sky pixels were included as positive examples, and negative examples were included by sampling from among all pixels that are neither blue sky nor water.

A feedforward neural network was structured with two hidden layers, containing 3 and 2 neurons, and a single output neuron (e.g., see Howard Demuth and Mark Beale, *Matlab Neural Network Toolbox*, The Math Works, Inc., 1998).

The hidden layer neurons had tangent-sigmoidal transfer functions, while the output neuron's transfer function was log-sigmoidal. The network was trained using Levenberg-Marquardt backpropagation to classify pixel values as ideal blue sky or non-sky (e.g., see Howard Demuth and Mark Beale). The target responses are a=1 for ideal blue sky pixels and a=0 for non-sky.

The color classifier, so trained, outputs a belief value between 0 and 1 for each pixel processed, 1 indicating a pixel highly likely to be blue sky and 0 indicating a pixel not very likely to be blue sky. To help visualize the invention's response to points in the (r,g,b) input space, a regularly-spaced grid of (r,g,b) triplets from example images processed with the invention is shown in FIG. 4A, with each color plane shown separately in FIGS. 4B–4D.

Figure 4A:
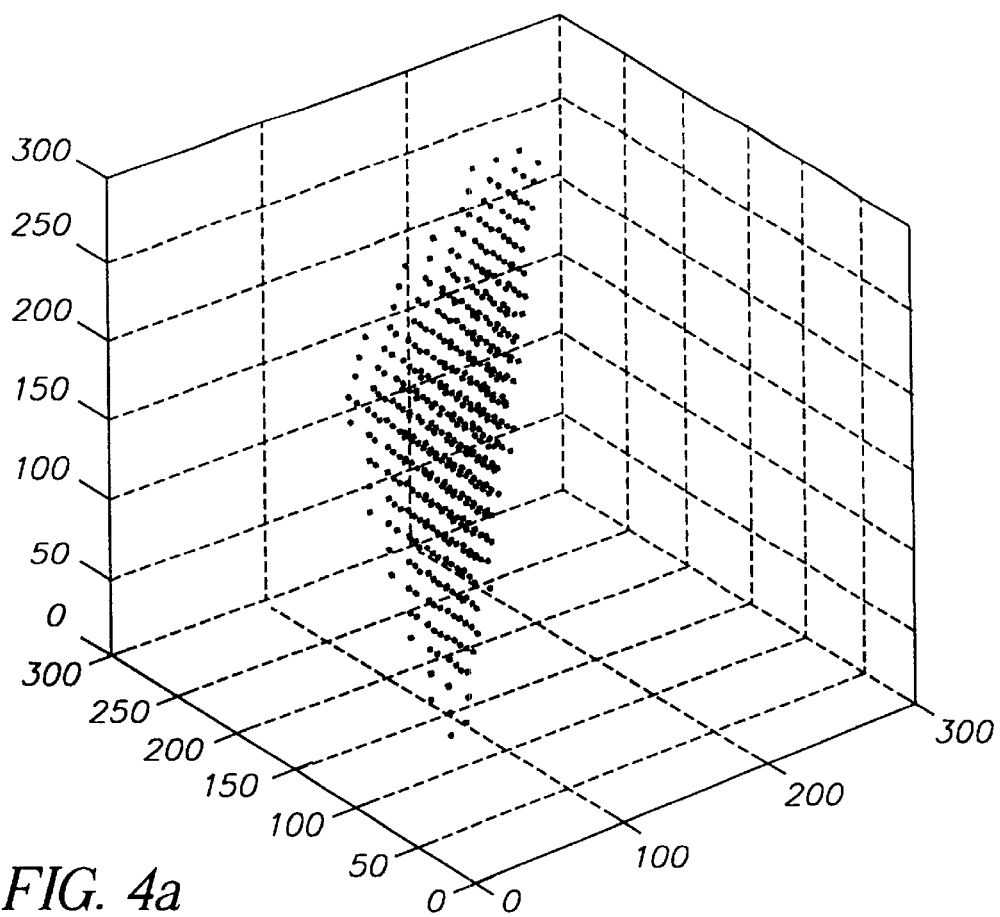
FIGS. 4A–4D show a three-dimensional graphical illustration of the cluster of blue sky in color space, and the respective color planes that portion of clusters.
Figure 4B:
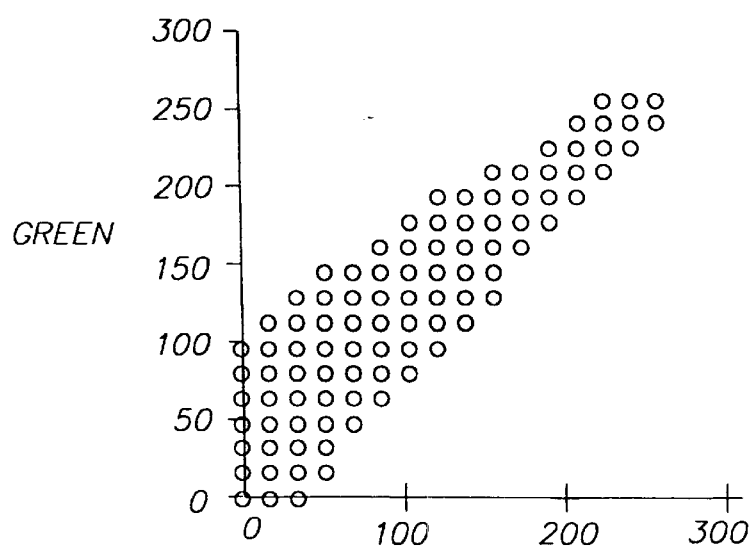
Figure 4C:
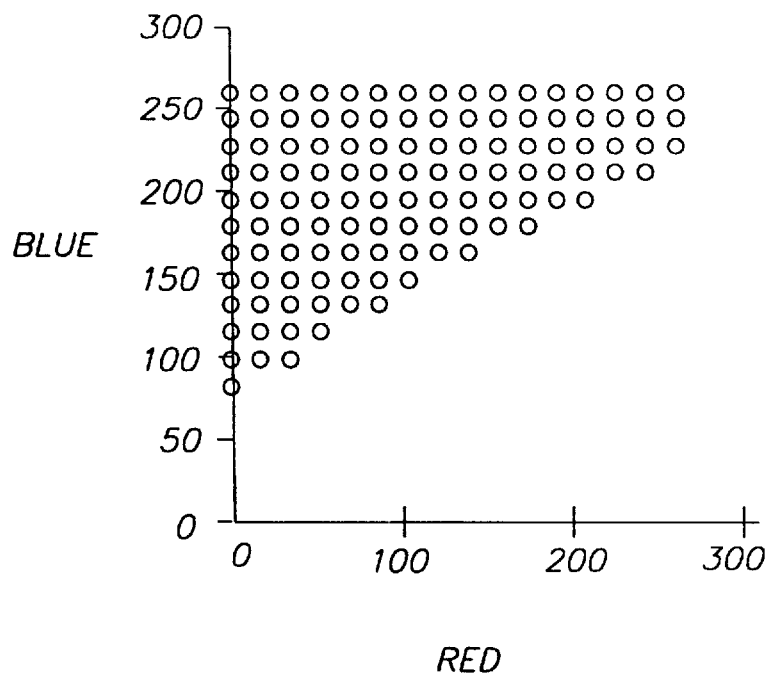
Figure 4D:
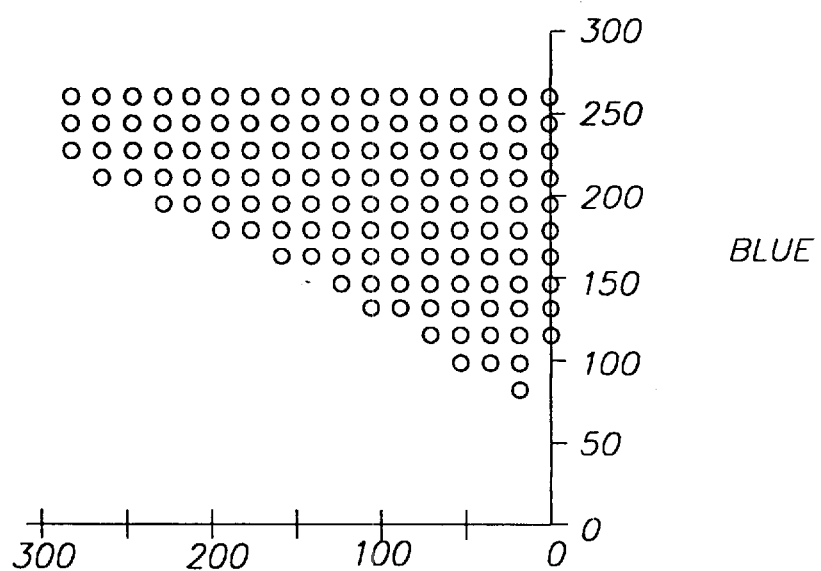

Points producing a blue-sky belief greater than 0.1 are marked by "." in FIG. 4A. The projections of this distribution onto the three planes are also shown (marked by "o"). Note that the distribution is highly elongated along the direction of luminance, and starts to diverge a bit towards lower luminance. For a specific input image, each pixel is classified independently, and a belief map is created by setting the brightness of each pixel proportional to its belief value. Examples of such belief maps are shown in FIGS. 12E–F and 13E–F.

Figure 5:
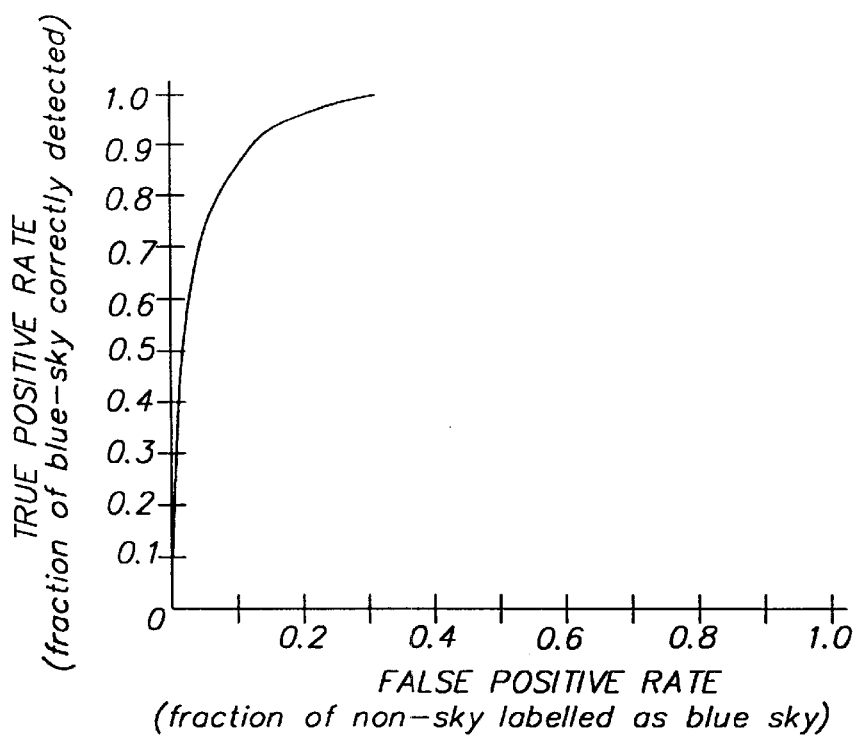
FIG. 5 is a graphical illustration of the receiver operating characteristic (ROC) of sky color classification.

A pixel-level receiver operating characteristic (ROC) of the inventive color classifier is shown in FIG. 5. This curve shows the true positive and false positive performance if the processing in the color classifier was immediately followed by a hard threshold at a variety of levels.

Conventionally, the global threshold is not dynamic and is found by locating the position on the curve closest to the upper left-hand corner of the graph shown in FIG. 5. For example, using a threshold of 0.0125 gives correct detection of 90.4% of blue sky pixels, but also detects (incorrectly) 13% of non-blue-sky pixels. Among those detected non-blue-sky pixels, water accounts for a significant portion. To the contrary, the invention does not employ a predefined "hard" threshold, but instead performs a region-extraction process before validating each region against a set of sky signatures. This process is discussed in detail below with respect to FIG. 7.

Figure 7:
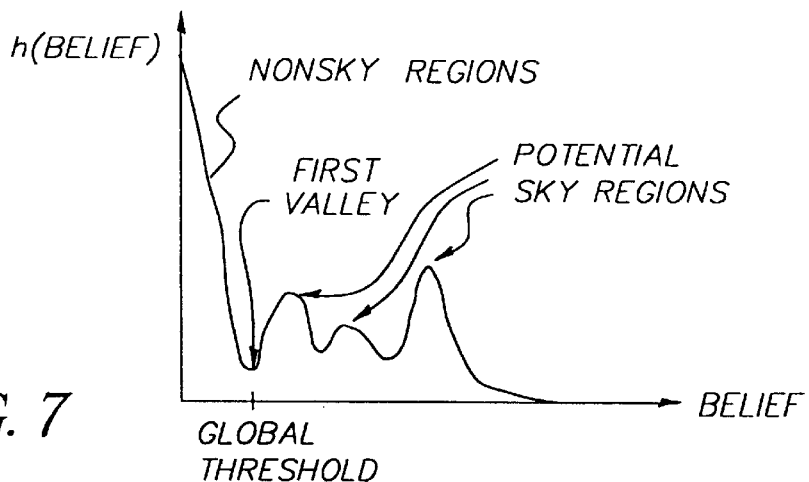
FIG. 7 is a graphical illustration of the threshold determination for sky color beliefs according to the invention.

More specifically, the inventive region extraction process (e.g., item 202 discussed above) automatically determines an appropriate threshold for the sky color belief map by finding the first valley point encountered moving from lower beliefs to higher beliefs in the belief histogram, and then performs a connected component analysis, as shown in FIG. 7. In addition, with the invention, the connected components are refined to produce a region-level representation of the sky segments, which facilitates sky signature validation that is otherwise impossible at the pixel level.

Figure 6:
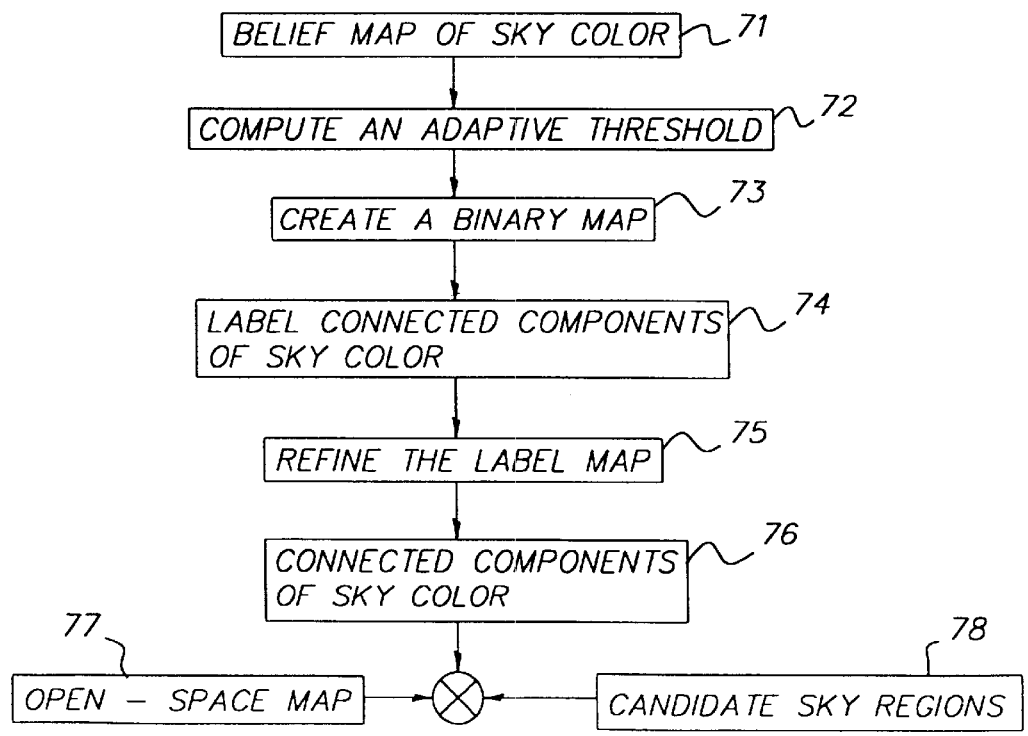
FIG. 6 is a schematic architectural diagram of the region extraction portion of the invention.

In FIG. 6, more detail is given for the region extraction process 202 (in FIG. 2). For a belief map 71, where the value of each pixel is proportional to the belief of that pixel having a sky color, a global threshold 72 is determined in an adaptive fashion, as discussed below with respect to FIG. 7. A binary map 73 is created using this threshold, whereas a "1" pixel is considered as a candidate sky pixel and a "0" pixel is considered as a non-sky pixel. Connected components, which are regions of spatially contiguous "1" pixels, are uniquely labeled 74 to produce spatially separated nonzero regions of sky color. Note that non-sky pixels are labeled to "0" (referred to herein as "unlabeled") regardless of their connectivity. Each connected component of sky color is refined 75 using two operations, which are discussed in greater detail below, to produce the connected components of sky color 76. An open space map 77 (which is also discussed below) is combined with the connected components to produce the candidate sky regions that are output by item 202 in FIG. 2.

FIG. 7 illustrates the inventive process for dynamically determining the global threshold. First, a histogram of the belief values is obtained from the belief map of sky color. Next, the histogram is smoothed to remove noise (e.g., producing the chart shown in FIG. 7). The first significant valley (e.g., "First valley" in FIG. 7) is found in the smoothed histogram. In a simple image where there is a distinctive sky region and everything else is distinctively non-sky, the histogram has only two peaks and one valley in between. In complex images there are sky, water and other blue regions. Therefore, the invention utilizes a different histogram for each image, which permits a dynamic threshold to be created for each individual image processed by the invention.

In Saber, supra, the last valley in the smoothed histogram was used to adjust a universal threshold in a maximum likelihood estimation (MLE) scheme based on the assumption that the true sky region in an image always has the highest probability. However, in some cases, a blue-colored non-sky region may have higher sky belief in terms of color. Therefore, the invention retains all sky-colored regions for further analysis and rules out non-sky regions that happen to have sky colors in the later stages of the sky detection process. Therefore, the belief value at which the first valley is located is chosen as the global threshold. As mentioned above, this threshold is determined adaptively for each individual image to accommodate different shades of sky as well as the image capturing conditions.

The first of the two refinement operations, discussed in item 75 above, is region splitting. Region splitting is used to split spatially connected bluish (potential sky) regions that belong to different objects but otherwise have similar belief values it terms of having sky color. For example, such a region could be blue cloth against blue sky. Such regions may have similar beliefs (in being typical colors of sky) and thus are not separable in the belief map.

However, such regions have different shades of blue colors and thus are separable using a general-purpose color segmentation processes, such as an adaptive k-means processing (e.g., see J. Luo, R. T. Gray, and H.-C. Lee "Towards A Physics-Based Segmentation Of Photographic Color Images," in Proc. *IEEE Int. Conf. Image Process.*, incorporated herein by reference). The invention utilizes this process and splits a labeled region of sky color into two or more regions (with unique new labels) if the region is a conglomerate of multiple regions indicated by the color segmentation process.

In another embodiment of the invention, an open-space detection process 77 (described in J. Warnick, R. Mehrotra and R. Senn, U.S. Pat. No. 5,901,245, "Method and system for detection and characterization of open space in digital images," incorporated herein by reference) can be used instead of a general-purpose color segmentation process. Open space is defined as a smooth and contiguous region in an image. It is very useful for placing a desired caption or figurative element in an image.

The automatic open-space detection process mentioned above (Warnick, supra) in based on two separate stages of operation. First, after a proper color space transformation is performed, a gradient-based activity map is computed and a proper threshold is determined according to a multi-region histogram analysis. In the second stage, a connected component analysis is performed on the binary activity map to fill voids and small regions are discarded. The open-space process as implemented in Warnick, supra, is both effective and efficient. Its speed is only a fraction of that required for the color segmentation process. In addition, open-space detection provides additional confirmation of the smoothness of the candidate regions. Therefore, in this preferred embodiment, the invention utilizes the open-space detection process. Thus, open space detection is incorporated to (1) rule out highly textured regions and (2) separate sky from other blue-colored regions such as bodies of water.

The second refinement operation performed in item 75 of FIG. 6 comprises region growing. The inventive region growing process is used to fill in holes and extend boundaries. This is especially useful where "marginal" pixels may have sky-color belief values that barely fail the global threshold but are close enough to the belief values of the neighboring pixels that have passed the initial global threshold.

With the invention a "growing threshold" is used to relabel such marginal pixels to a connected component if the difference in belief values between an "unlabeled" pixel and its neighboring "labeled" pixel is smaller than a second threshold for region growing. More specifically, seed regions are created by taking the intersection between pixels with supra-threshold belief values and the connected components in the open-space map. For pixels with sub-threshold belief values, region growing is guided by the continuity in belief values as well as continuity in color values. Small, isolated sky regions are ignored.

In the sky signature measures, which are discussed above in item 207 in FIG. 2, one-dimensional traces are extracted within the region along the horizon-to-zenith direction. The invention automatically determines the sky orientation based on the distribution of both vertical/horizontal gradients in each extracted region.

More specifically, the invention uses the red signal to determine the sky orientation, because of the physics-motivated model of sky. As discussed above, with the physics-motivated model of sky, the amount of light scattering depends on the wavelength of the light and the scattering angle. In general, the desaturation effect towards the horizon is caused by the increase in red light and green light relative to blue light. Furthermore, the present inventors have determined that blue light stays relatively unchanged along the horizon-zenith direction. The change in the green signal may not be as pronounced as in the red signal. Therefore, the red signal provides the most reliable indication of the desaturation effect. Consequently, the uneven gradient distribution is most observable in the red signal.

Figure 8A:
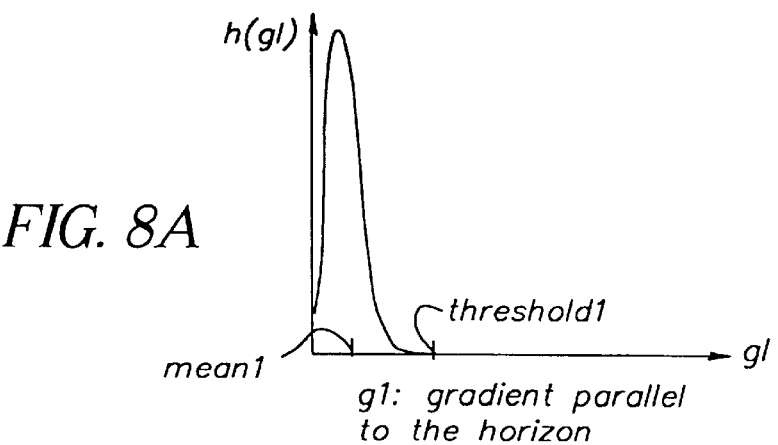
FIGS. 8A–8B are graphical illustrations of typical distributions of gradient magnitudes in a sky region.
Figure 8B:
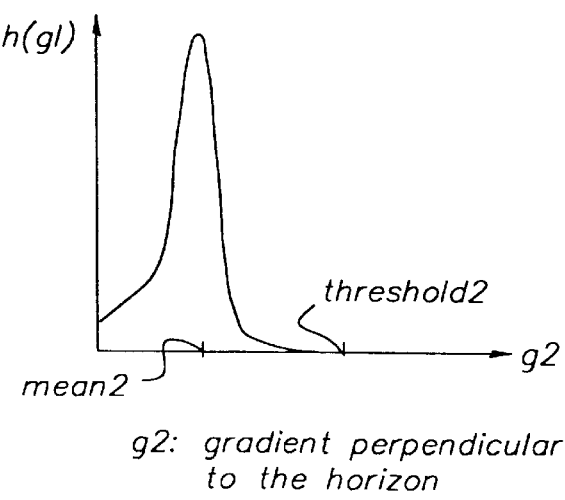

Because of the desaturation effect, sky has low gradient in the horizon-zenith direction, but is essentially constant in the perpendicular direction. When the position of the sun is high above the horizon, the concentric distribution of the scattering light can be approximated by horizontal strips of different color regions (e.g., see FIG. 3, barring lens falloff effect). Therefore, the distribution of gradient has different characteristics in horizontal and vertical directions, as shown by FIGS. 8A and 8B (which are parallel and perpendicular to the horizon, respectively), where mean1<<mean2.

After region extraction 202 and orientation determination 205, the sky signature validation process extracts one-dimensional traces within the region along the determined horizon-to-zenith direction 206, determines by a set of rules whether the trace resembles a trace from the sky 207, and finally computes the sky belief of the region by the percentage of traces that fit the physics-based sky trace model 208, as discussed above.

Figure 10A:
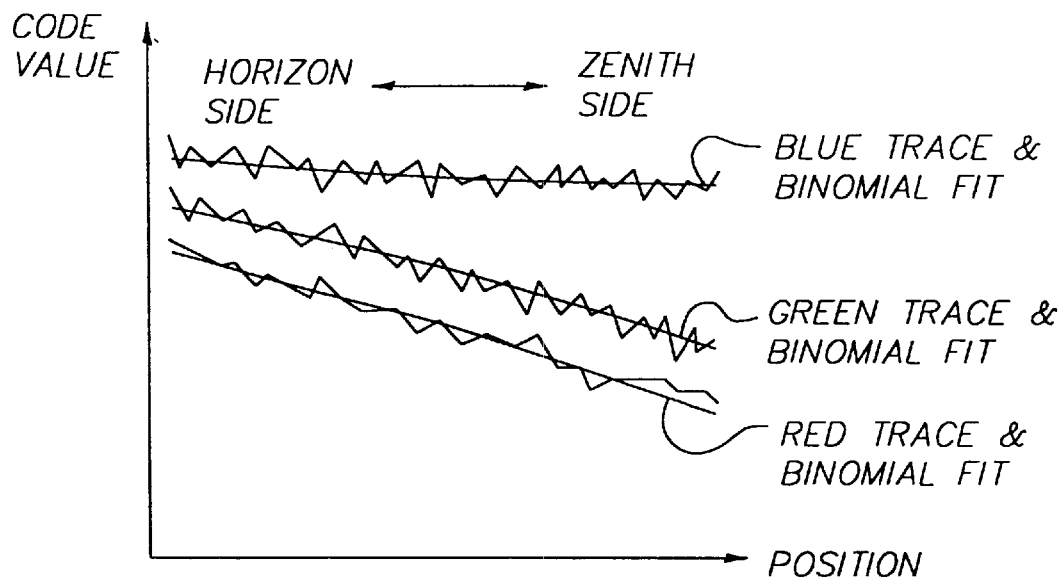
FIG. 10A is a graph showing a typical trace of clear sky.
Figure 10B:
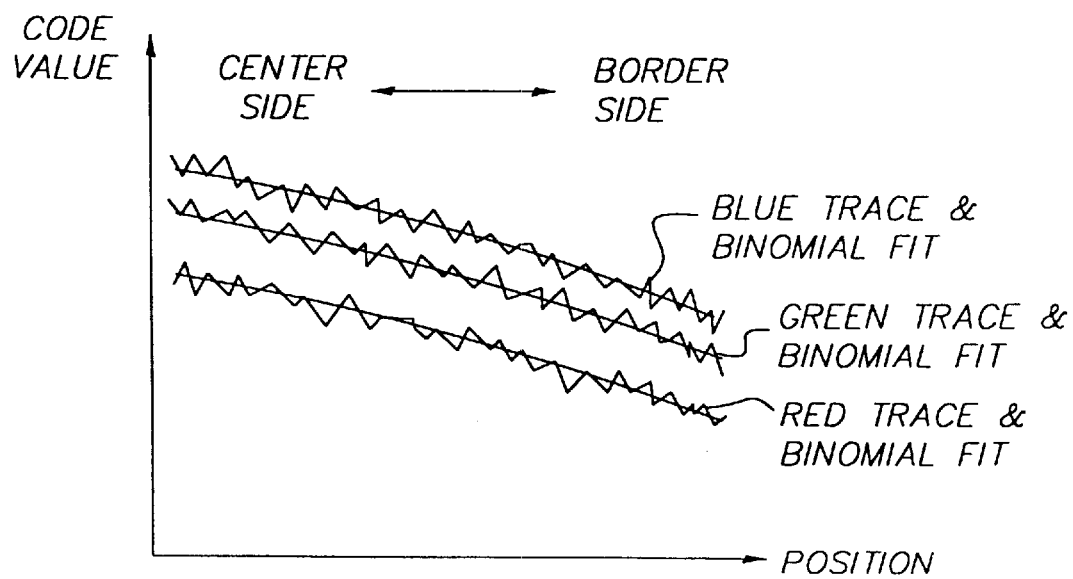
FIG. 10B is a graph showing a typical trace of a blue wall.

Based on the analysis of numerous one-dimensional traces from sky as well as a few other typical sky-colored subject matters in images, the invention includes models to quantify these traces. In particular, traces extracted along the horizon-zenith direction reveal a signature of sky traces shown in FIG. 10A. The blue signal of a sky trace tends to be constant across the sky; the green signal and red signal gradually decrease away from the horizon; the red signal decreases faster than the green signal. More specifically, all the three signals can be approximated by lower-order polynomials (e.g., quadratic polynomials). The micro-variations in the three signals are not correlated. In comparison, a few other blue-colored subject matters do not exhibit such a signature. To the contrary, in FIG. 10B, there is shown a typical trace of a blue wall in a flash-fired picture, where the three signals change smoothly in parallel.

Figure 11A:
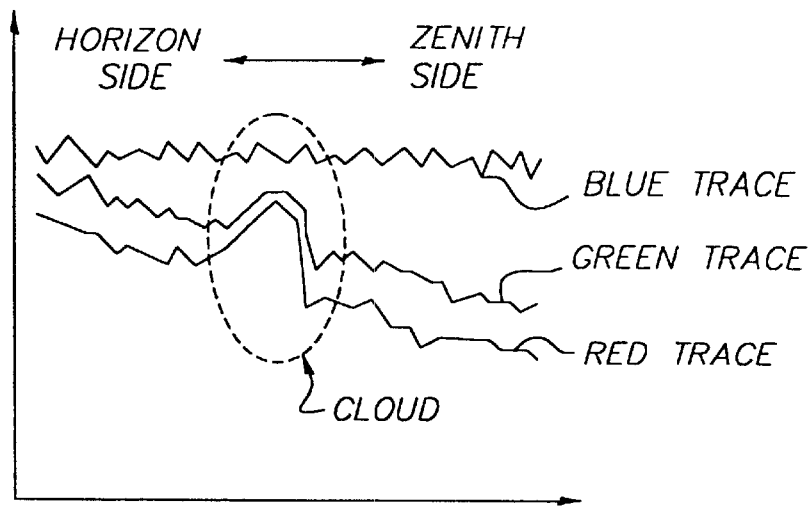
FIG. 11A is a graph showing a typical trace of mixed sky and clouds.
Figure 11B:
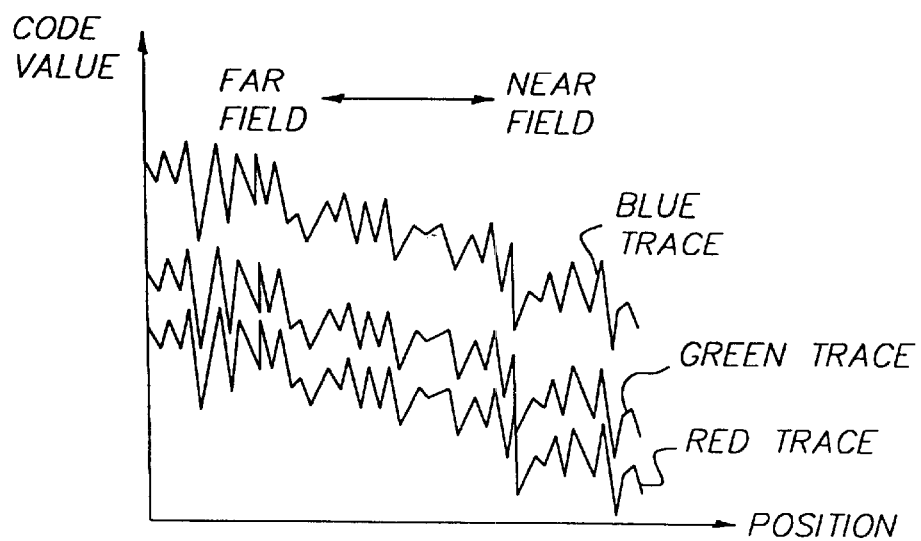
FIG. 11B is a graph showing a typical trace of water.

Similarly, FIG. 11B shows a typical trace through a body of water, where the three signals are highly correlated in local variations. Both of these two cases indicate that the changes are mostly in luminance. Furthermore, as illustrated in FIG. 11A, in mixed sky where (white) clouds are present together with clear blue sky, the red and green signals jump high in the clouds while the blue signal stays the same to create a neutral cloud region. Typically, the red signal jumps up by a larger amount than the green signal in the clouds.

Figure 9:
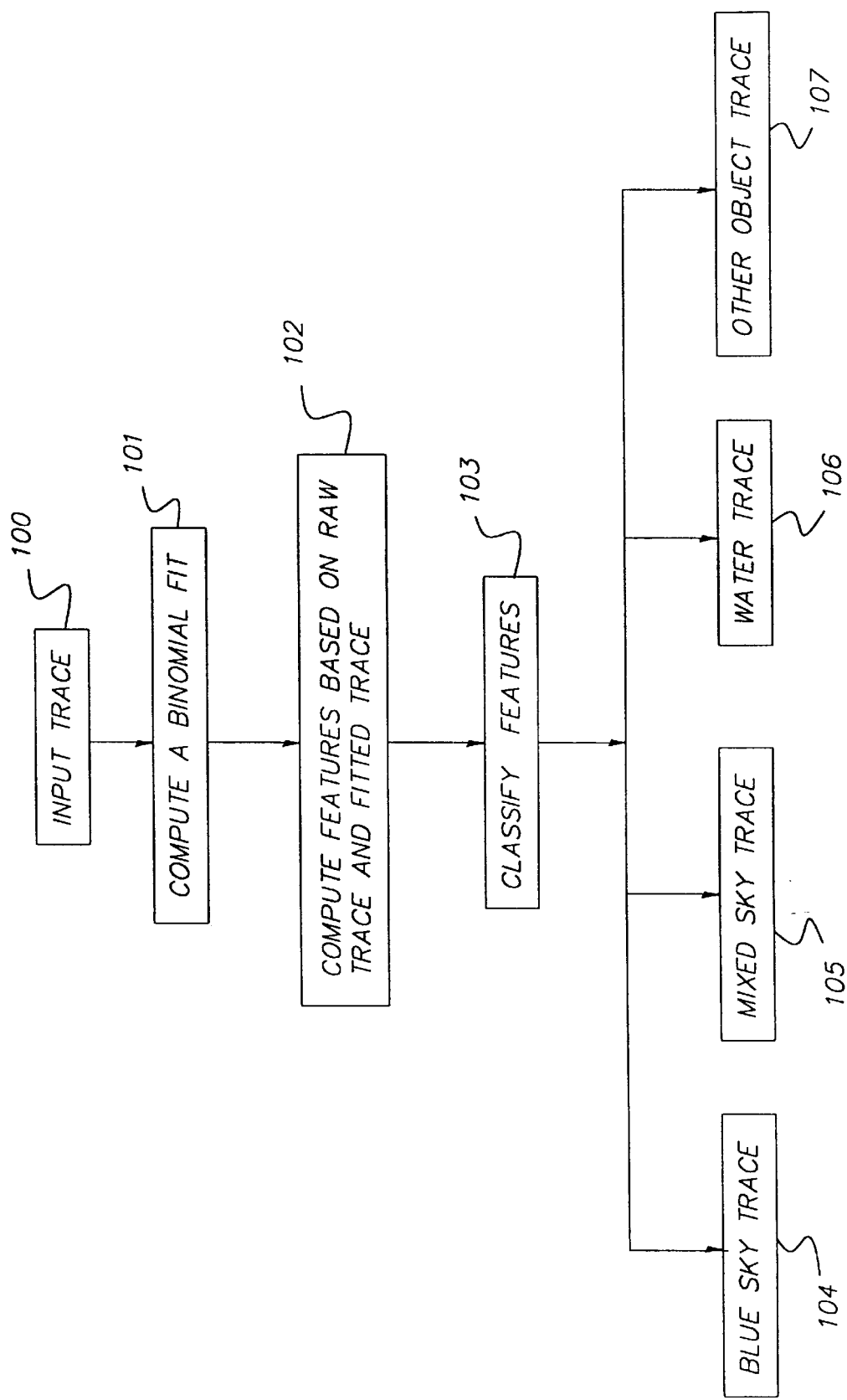
FIG. 9 is a schematic architectural diagram of the trace analysis performed by the invention.

FIG. 9 is a flowchart illustrating the processing of the input trace. More specifically, in item 100, an extracted trace is analyzed with respect to the trace models shown in FIGS. 10A–11B. First, a quadratic polynomial fit 102 is computed for the three signals, red, green and blue, respectively. The quadratic polynomial is given as $y=f(x)=c1+c2*x+c3*x^2$ where x denotes to the index of the one-dimensional trace and y is the code value of the corresponding signal.

Next, a plurality of features ("signatures") are computed based on either the raw trace or the fitted trace 102. Features are classified 103 so that a trace can be characterized as a blue sky trace 104, or a non-blue-sky trace (a mixed sky trace 105, a water trace 106, or "unknown" 107). In the example shown below, ten measures ("signatures") are computed for each extracted sky trace.

However, one ordinarily skilled in the art could prepare any number of such signatures in light of this disclosure.

The first signature regards the offset of the fitting quadratic polynomial. The offsets are related to the mean values in red, green, and blue channels. This signature feature requires the average blue component to be above the average red and green components. Due to the specific way a trace is extracted, this feature actually translates into the requirement that the blue component is the strongest at the most blue side of the trace. Pseudo code for such a logical statement follows.

If (cb[1]>cr[1]+BR_OFFSET&&cb[1]>cg[1]-BG_OFFSET&&cg[1]>cr[1]-RG_OFFSET) sig1=1;
where
define BR_OFFSET 10
define BG_OFFSET 5
define RG_OFFSET 5

Instead of using the above crisp rule, it may be advantageous to use a trapezoidal fuzzy scoring function of continuous values with a cutoff point with a certain HUGEPENALTY if this condition is violated.

The second exemplary signature regards the slope of the fitting quadratic polynomial. In general, due to the specific way a trace is extracted, the slopes of RGB signals are negative. This feature requires that the blue signal decreases (if so) slower than the red and green signals. On the other hand, monotonic increase (positive slope) is also allowed by this feature. C-language-like pseudo code for such a logical statement follows.

if (cb[2]>cg[2]&&cb[2]>cr[2]) sig2=1;
if (!sig2&&sig2bg&&sig2br) sig2=1;

This is implemented as a crisp rule. Exception is granted to relax the strict condition of sig2 to two more loosely defined conditions sig2bg and sig2br when sig2 is not satisfied.

The third signature regard the similarity or parallelism among the fitted signals. Pseudo code for such a logical statement follows.

if ((rgdist<brdist&&bgdist<brdist)
 || (rgdist<bgdist&&rgdist<brdist)) sig3=1;

Note that rgdist is used to indicate the difference ("distance") between two fitted red and green signals. It is determined in the following way. First, one of the two signals is shifted appropriately such that the shifted signal has the same value at the starting point as the unshifted signal. Let the fitted red and green signals be $$r(x)=c_1{}^r+c_2{}^r x+c_3{}^r x^2,\ g(x)=c_1{}^g+c_2{}^g x+c_3{}^g x^2 \quad (7)$$

then $$\hat{r}(x)=r(x)+(c_1{}^g-c_1{}^r)=c_1{}^g+c_2{}^r x+c_3{}^r x^2 \quad (8)$$

such that $\hat{r}(0)=g(0)$.

Next, the difference or distance between the fitted red and green signals is given by $$rg\text{dist}=|\hat{r}(L/2)-g(L/2)| \quad (9)$$

where L is the total length of the trace. In other words, this feature measures the difference between two fitted signals by the distance at two midpoints when one of them is shifted so that both signals have the same starting value. The other two terms, bgdist and brdist, are defined in a similar fashion. One possibility here is not to use the absolute values such that sign information is used in conjunction with the absolute difference.

The fourth signature regards red-green similarity. The red and green signals should be reasonably similar. Pseudo code for such a logical statement follows.

if (rgdist<MAXRGDIST) sig4=1;
where
define MAXRGDIST 15

The fifth signature regards low nonlinearity. All the three signals should have low nonlinearity. Pseudo code for such a logical statement follows.

If (fabs(cb[3])<MAXNONLINEARITY&&fabs(cg[3])
   <MAXNONLINEARITY&&fabs(cr[3])
   <MAXNONLINEARITY) sig5=1;
where
define MAXNONLINEARITY 0.05

Instead of using the above crisp rule, it may be advantageous to use a sigmoid fuzzy scoring function of continuous values with a cutoff point with a certain HUGEPENALTY if this condition is violated. The sixth signature regards red-green-blue correlation for large modulation. Pseudo code for such a logical statement follows.

if (largesignal&&corr_rg>0.5&&corr_br<0.3&&corr_bg<0.3) sig6=1; // red-grn-blue correlation for large modulation
    else if (!largesignal&&corr_rg>0.2&&corr_br<0.4&&corr_bg<0.4) sig6=1; // red-grn-blue correlation for small modulation
    else if (largesignal==-1) sig6=1; // red-grn-blue correlation for micro modulation
    if (largesignal !=-1&&corr_rg>0.9&&corr_rg>5*corr-br&&corr_rg>5*corr-bg) sig6=-1; // significantly higher red-grn correlation where corr_xy denotes the correlation coefficient between signal x and y. Again, instead of using the above crisp rule, it may be advantageous to use a sigmoid fuzzy scoring function of continuous values with a cutoff point with a certain HUGEPENALTY if this condition is violated (s>0.95). The seventh signature regards red-green-blue similarity or near parallelism. Pseudo code for such a logical statement follows.

if (rgdist<MINDIST&&bgdist<MINDIST&&brdist
   <MINDIST) sig7=0;
where
define MINDIST 1.5

As before, instead of using the above crisp rule, it may be advantageous to use a sigmoid fuzzy scoring function of continuous values with a cutoff point with a certain HUGEPENALTY if this condition is violated (s>0.95).

The eighth signature regards negative red/green slope. Pseudo code for such a logical statement follows.

if (cr[2]>0 AND cg[2]>0) sig8=0;

This is implemented as a crisp rule.
The ninth signature regards goodness of the fit. Pseudo code for such a logical statement follows.

```
if (rchisq>MAXCHISQ_R&&gchisq>MAXCHISQ_
    G&&bchisq>MAXCHIS_B) sig9=0;
where
# define MAXCHISQ—R 50
# define MAXCHISQ—G 25
# define MAXCHISQ—B 100
``` where CHISQ denotes a χ-square fitting error.

Also, instead of using the above crisp rule, it may be advantageous to use a sigmoid fuzzy scoring function of continuous values with a cutoff point where a certain HUGEPENALTY if this condition is violated (s<0.1).

Signature ten regards the decrease in red and green signals. Pseudo code for such a logical statement follows.

sigA=rdec*gdec;

where rdec indicates whether the red signal decreases (monotonically). In particular, rdec is determined using the fitted red signal by taking two samples, first x1 at ¼th point and second x2 at ¾th point of the total length, respectively. Pseudo code for such a logical statement follows.

```
if (x2<x1)
    rdec=1;
else
    rdec=0
```

The other term gdec is determined in a similar fashion for the green signal. This is implemented as a crisp rule. Note that sigA=1 if and only if rdec=1 and gdec=1.

These ten features are integrated in the current rule-based process as a crisp decision; a given trace is only declared a sky trace when all the conditions are satisfied, i.e.,

```
if (sig1&&sig2&&sig3&&sig4&&sig5&&sig6
    !=0&&sig7&&sig8&&sig9&&sigA) skysignature=1;
Or, in a fuzzy logic-based algorithm,
    if (sig1>EFFECTIVEZERO&&sig2>EFFECTIVEZER
        O&&sig3>EFFECTIVEZERO&&sig4>EFFECTIVE
        ZERO&&sig5>EFFECTIVEZERO&&fabs(sig6)
        >EFFECTIVEZERO)
        &&sig7>EFFECTIVEZERO&&sig8>EFFECTIVEZ
        ERO&&sig9>EFFECTIVEZERO&&sigA>EFFECT
        IVEZERO) skysignature=(sig1+sig2+...+sig9+sigA)/
        10
where
# define EFFECTIVEZERO 0.1
```

Upon examination of all candidate traces, which are mostly (e.g., 95%) of sky-colored pixels, the sky belief of the region is computed as the percentage of traces that satisfy the physics-based sky trace model. A sky-colored region is declared as non-sky if the sky belief is below a threshold (empirically determined at 0.25 in this example for general purposes).

FIGS. 12A–13H illustrate the invention's performance on various images. More specifically, FIGS. 12A–B and 13A–B illustrate original images to be processed. FIGS. 12C–D and 13C–D represent the results of the color classification process of the invention shown in item 201 in FIG. 2, discussed above. FIGS. 12E–F and 13E–F illustrate the result of the open space map (item 77 in FIG. 6) produced by the invention. FIGS. 12G–H and 13G–H illustrate the invention's determination of the sky regions as white portions and non-sky regions as black portions. The brightness level in FIGS. 12C–D and 13C–D is proportional to the sky color beliefs, however the brightness level in 12E–F and 13E—F merely indicates separated label regions.

Figure 12A:
FIGS. 12A–12H illustrate different stages of images processed by the invention.
Figure 12C:
Figure 12E:
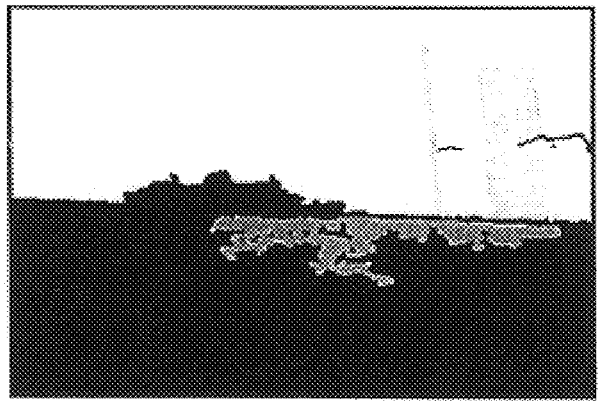
Figure 12G:
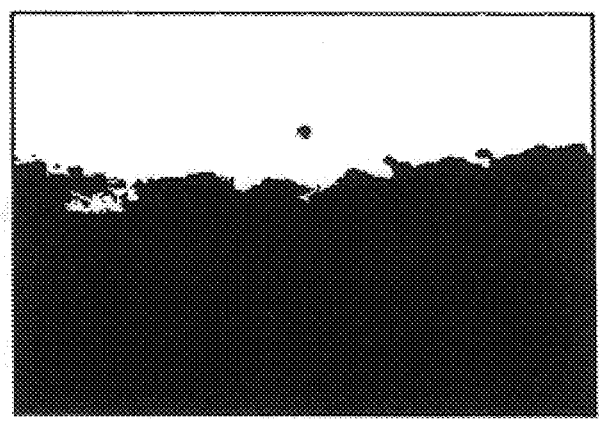
Figure 12B:
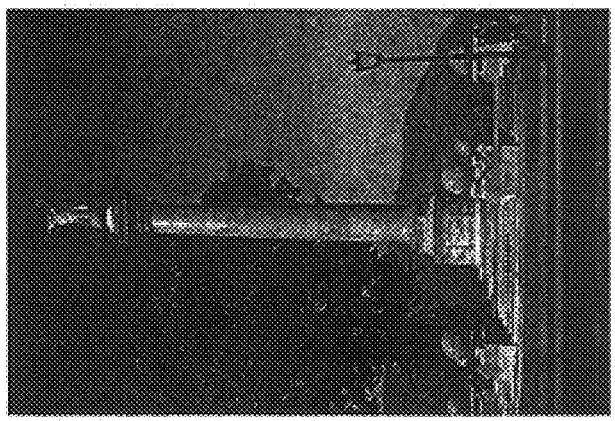
Figure 12D:
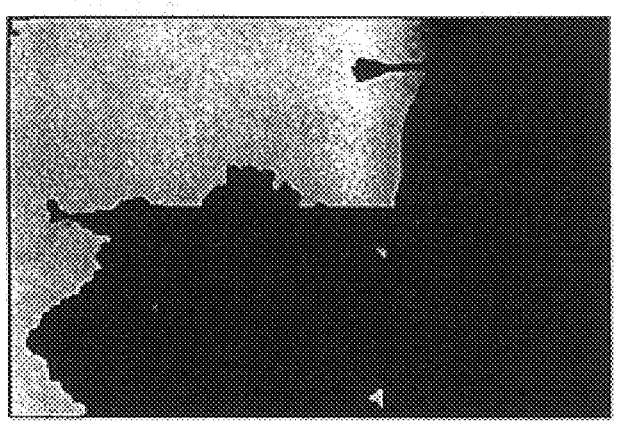
Figure 12F:
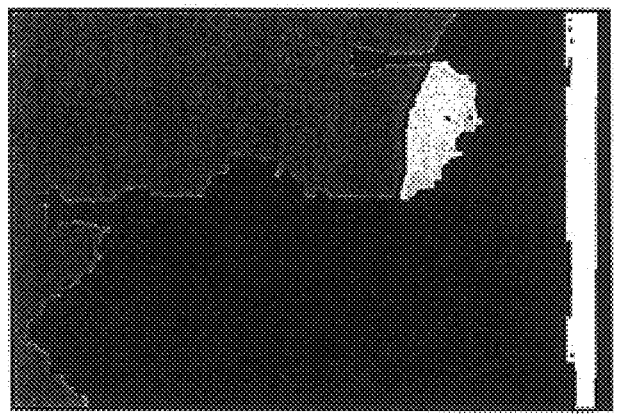
Figure 12H:
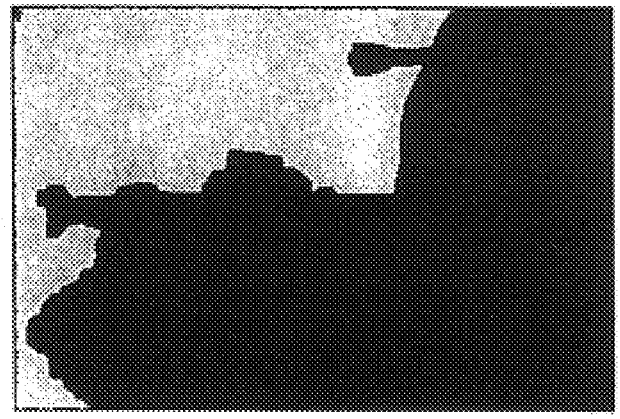
Figure 13A:
FIGS. 13A–13H illustrate different stages of images processed by the invention.
Figure 13C:
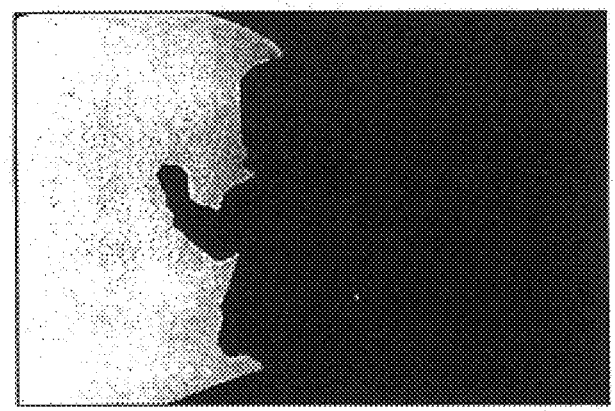
Figure 13E:
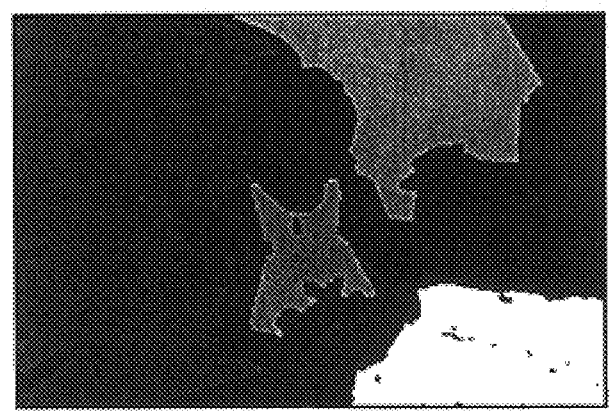
Figure 13G:
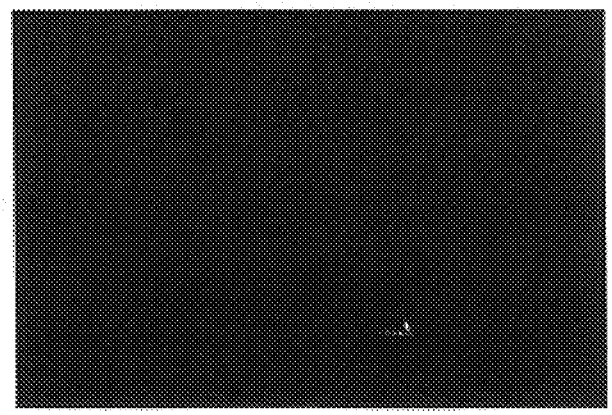
Figure 13B:
Figure 13D:
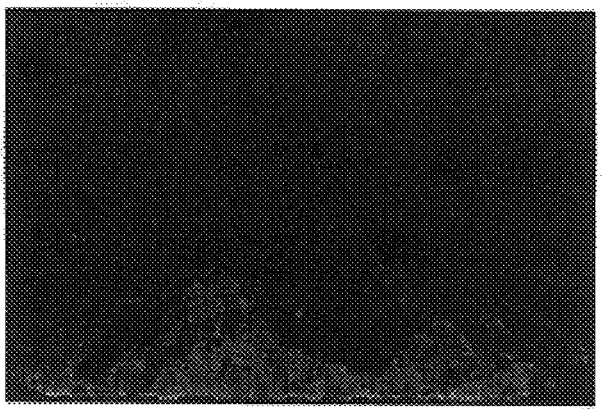
Figure 13F:
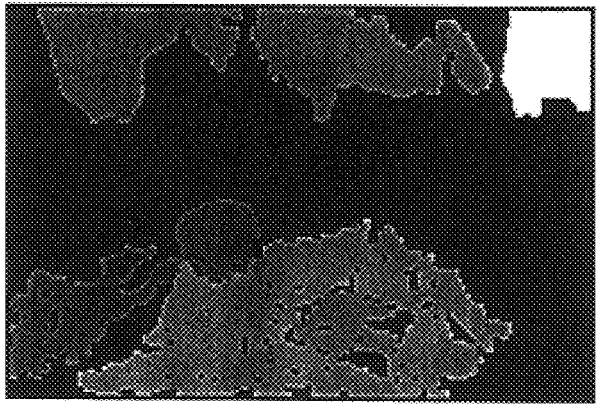
Figure 13H:
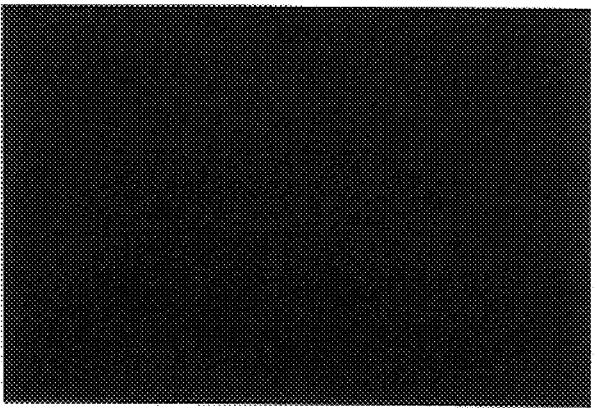

The invention works well on RGB images produced by such sources as film and digital cameras. The detected sky regions show excellent alignment to perceptual boundaries. The few examples shown in FIGS. 12A–12H demonstrate the performance of the invention. The sky and the sea are correctly separated and the true sky region is detected in FIG. 12G. Based on correct detection of the sky region, the image in FIG. 12A is determined to be an upside-up landscape image. The image in FIG. 12B is an example where the assumption of sky at the top is invalid but the sky is nevertheless correctly detected by the proposed process based on correct determination of the sky orientation. Based on correct detection of the sky region, the image in FIG. 12B is determine to be an upside-left portrait image. A smooth blue object in FIG. 13A and a textured table cloth in FIG. 13B are correctly rejected, respectively, by the invention. As a result of the absence of true sky regions in these two images, the image orientation remains undetermined. Under the assumptions that (1) a blue region is sky and (2) the sky is always at the top (e.g., Goodwin supra), the images would be incorrectly determined as upside-left in FIG. 13A and upside-down in FIG. 13B.

Given the effectiveness of the inventive sky signature validation process, it is possible to relax the color classification stage to include other off-blue shades of the sky, such as the shades at sunset or sunrise. In contrast to overcast sky, cloudless sky at sunset or sunrise exhibits similar scattering effect as the counterpart during the day. The main difference is the warm color tint from the rising or setting sun.

A 2D planar fit of a candidate region is an alternative way of conducting sky validation. For regions that have holes, the weighting factor at hole locations can be set to zero so that only the sky-colored pixels contribute to the planar fit. It may be necessary to require that the holes can only be due to bright neutral objects (clouds) to limit the potential increase of false positive detection.

Therefore, the invention comprises a system scene orientation that is based on sky identification. The sky identification uses color classification, region extraction, and physics-motivated sky signature validation. The invention works very well on 8-bit images from sources including film and digital cameras after pre-balancing and proper dynamic range adjustment.

As mentioned above, the invention utilizes a physical model of the sky based on the scattering of light by small particles in the air. By using a physical model (as opposed to a color or texture model), the invention is not likely to be fooled by other similarly colored subject matters such as bodies of water, walls, toys, and clothing. Further, the inventive region extraction process automatically determines an appropriate threshold for the sky color belief map. By utilizing the physical model in combination with color and texture filters, the invention produces results that are superior to conventional systems.

While the invention has been described in terms of preferred embodiments, those skilled in the art will recognize that the invention can be practiced with modification within the spirit and scope of the appended claims.

What is claimed is:

1. A method of determining image orientation comprising:
    classifying potential sky pixels in said image by color;
    identifying spatially contiguous regions of said potential sky pixels;
    identifying actual sky regions by eliminating ones of said spatially contiguous regions that have a texture above a predetermined texture threshold;

computing desaturation gradients of said actual sky regions;

classifying said image as one of portrait and landscape based on average absolute values of horizontal and vertical desaturation gradient of pixels within each of said actual sky regions;

determining orientation of said image based on a polarity of said average horizontal and vertical desaturation gradients; and confirming that said actual sky regions are true sky regions by comparing said desaturation gradients with a predetermined desaturation gradient for sky.

2. The method in claim 1, further comprising maintaining only ones of said spatially contiguous regions as said actual sky regions which:

have substantially dissimilar average horizontal and vertical gradients;

have a color distribution which is consistent with a predetermined color distribution for sky; and contact a border of said image.

3. The method in claim 1, wherein said classifying said image as one of portrait and landscape includes:

classifying said image as said portrait if an absolute value of said average horizontal desaturation gradient is greater than an absolute value of said average vertical desaturation gradient; and classifying said image as said landscape if an absolute value of said average horizontal desaturation gradient is less than an absolute value of said average vertical desaturation gradient.

4. The method in claim 1, wherein said desaturation gradients comprise desaturation gradients for red, green and blue trace components of said image.

5. The method in claim 1, wherein said predetermined desaturation gradient for sky comprises, from horizon to zenith, a decrease in red and green light trace components and a substantially constant blue light trace component.

6. The method in claim 1, wherein said classifying potential sky pixels in said image by color comprises:

forming a belief map of sky color pixels;

computing an adaptive threshold of sky color; and determining if said potential sky pixels exceed said threshold.

7. The method in claim 6, wherein said computing of said adaptive threshold comprises identifying a first valley in a belief histogram derived from said belief map.

8. The method in claim 7, wherein said belief map and said belief histogram are unique to said image.

9. A method of determining image orientation comprising:

classifying sky pixels in said image by color;

computing desaturation gradients of said sky pixels;

classifying said image as one of portrait and landscape based on average absolute values of horizontal and vertical desaturation gradient of said sky pixels; and determining orientation of said image based on a polarity of said average horizontal and vertical desaturation gradients.

10. The method in claim 9, further comprising:

identifying spatially contiguous regions of said sky pixels; and identifying actual sky regions by eliminating ones of said spatially contiguous regions that have a texture above a predetermined texture threshold.

11. The method in claim 10, further comprising confirming that said actual sky regions are true sky regions by comparing said desaturation gradients with a predetermined desaturation gradient for sky.

12. The method in claim 10, further comprising maintaining only ones of said spatially contiguous regions as said actual sky regions which:

have substantially dissimilar average horizontal and vertical desaturation gradients;

have a color distribution which is consistent with a predetermined color distribution for sky; and contact a border of said image.

13. The method in claim 9, wherein said classifying said image as one of portrait and landscape includes:

classifying said image as said portrait if an absolute value of said average horizontal desaturation gradient is greater than an absolute value of said average vertical desaturation gradient; and classifying said image as said landscape if an absolute value of said average horizontal desaturation gradient is less than an absolute value of said average vertical desaturation gradient.

14. The method in claim 9, wherein said desaturation gradients comprise desaturation gradients for red, green and blue trace components of said image.

15. The method in claim 11, wherein said predetermined desaturation gradient for sky comprises, from horizon to zenith, a decrease in red and green light trace components and a substantially constant blue light trace component.

16. The method in claim 9, wherein said classifying sky pixels in said image by color comprises:

forming a belief map of sky color pixels;

computing an adaptive threshold of sky color; and determining if said sky color pixels exceed said threshold.

17. The method in claim 16, wherein said computing of said adaptive threshold comprises identifying a first valley in a belief histogram derived from on said belief map.

18. The method in claim 17, wherein said belief histogram and said belief map are unique to said image.

19. A image orientation identification system comprising:

a color classifier classifying sky pixels in said image by color;

a logic unit computing desaturation gradients of said sky pixels;

a portrait/landscape classifier classifying said image as one of portrait and landscape based on average absolute values of horizontal and vertical desaturation gradient of said sky pixels; and a comparator determining orientation of said image based on a polarity of said average horizontal and vertical desaturation gradients.

20. The image orientation identification system in claim 19, further comprising:

a second comparator identifying spatially contiguous regions of said sky pixels; and a third comparator identifying actual sky regions by eliminating ones of said spatially contiguous regions that have a texture above a predetermined texture threshold.

21. The image orientation identification system in claim 20, further comprising a fourth comparator confirming that said actual sky regions are true sky regions by comparing desaturation gradients of said actual sky regions with a predetermined desaturation gradient for sky.

22. The image orientation identification system in claim 20, wherein said third comparator only maintains ones of said spatially contiguous regions as said actual sky regions that:

have substantially dissimilar average horizontal and vertical desaturation gradients;

have a color distribution which is consistent with a predetermined color distribution for sky; and contact a border of said image.

23. The image orientation identification system in claim 19, wherein said portrait/landscape classifier:

classifies said image as said portrait if an absolute value of said average horizontal desaturation gradient is greater than an absolute value of said average vertical desaturation gradient; and classifies said image as said landscape if an absolute value of said average horizontal desaturation gradient is less than an absolute value of said average vertical desaturation gradient.

24. The image orientation identification system in claim 21, wherein said desaturation gradients of said actual sky regions comprise desaturation gradients for red, green and blue trace components of said image.

25. The image orientation identification system in claim 21, wherein said predetermined desaturation gradient for sky comprises, from horizon to zenith, a decrease in red and green light trace components and a substantially constant blue light trace component.

26. The image orientation identification system in claim 19, wherein said color classifier:

forms a belief map of sky color pixels;

computes an adaptive threshold of sky color; and determines if said potential sky pixels exceed said threshold.

27. The image orientation identification system in claim 26, wherein said color classifier computes said adaptive threshold by identifying a first valley on a belief histogram derived from said belief map.

28. The image orientation identification system in claim 27, wherein belief histogram and said belief map are unique to said image.

29. A method of using and a computer program running on a computer system to determine image orientation, said method comprising:

using said computer program to classify sky pixels in said image by color;

using said computer program to compute desaturation gradients of said sky pixels;

using said computer program to classify said image as one of portrait and landscape based on average absolute values of horizontal and vertical desaturation gradient of said sky pixels; and using said computer program to determine orientation of said image based on said average horizontal and vertical desaturation gradients.

30. The method in claim 29, further comprising:

using said computer program to identify spatially contiguous regions of said sky pixels; and using said computer program to identify actual sky regions by eliminating ones of said spatially contiguous regions that have a texture above a predetermined texture threshold.

31. The method in claim 30, further comprising using said computer program to confirm that said actual sky regions are true sky regions by comparing said desaturation gradients with a predetermined desaturation gradient for sky.

32. The method in claim 30, further comprising using said computer program to maintain only ones of said spatially contiguous regions as said actual sky regions which:

have substantially dissimilar average horizontal and vertical desaturation gradients;

have a color distribution which is consistent with a predetermined color distribution for sky; and contact a border of said image.

33. The method in claim 29, wherein said using said computer program to classify said image as one of portrait and landscape includes:

using said computer program to classify said image as said portrait if an absolute value of said average horizontal desaturation gradient is greater than an absolute value of said average vertical desaturation gradient; and using said computer program to classify said image as said landscape if an absolute value of said average horizontal desaturation gradient is less than an absolute value of said average vertical desaturation gradient.

34. The method in claim 29, wherein said desaturation gradients comprise desaturation gradients for red, green and blue trace components of said image.

35. The method in claim 31, wherein said predetermined desaturation gradient for sky comprises, from horizon to zenith, a decrease in red and green light trace components and a substantially constant blue light trace component.

36. The method in claim 29, wherein said using said computer program to classify sky pixels in said image by color comprises:

using said computer program to form a belief map of sky color pixels;

using said computer program to compute an adaptive threshold of sky color; and using said computer program to determine if said sky color pixels exceed said threshold.

37. The method in claim 36, wherein said using said computer program to compute said adaptive threshold comprises using said computer program to identify a first valley in a belief histogram derived from on said belief map.

38. The method in claim 37, wherein said belief histogram and said belief map are unique to said image.

* * * * *